US008972102B2

(12) United States Patent
Reindl

(10) Patent No.: US 8,972,102 B2
(45) Date of Patent: Mar. 3, 2015

(54) GOLF BALL TRACKING SYSTEM AND METHODS THEREFOR

(76) Inventor: Kinch Robert Reindl, Denver, CO (US)

(*) Notice: Subject to any disclaimer, the term of this patent is extended or adjusted under 35 U.S.C. 154(b) by 127 days.

(21) Appl. No.: 13/481,604

(22) Filed: May 25, 2012

(65) Prior Publication Data

US 2012/0303207 A1 Nov. 29, 2012

Related U.S. Application Data

(60) Provisional application No. 61/490,781, filed on May 27, 2011.

(51) Int. Cl.
*G01M 17/00* (2006.01)
*A63B 69/36* (2006.01)
*A63B 43/00* (2006.01)
*G06Q 10/00* (2012.01)
*A63B 47/02* (2006.01)
*A63B 24/00* (2006.01)

(52) U.S. Cl.
CPC ............ *A63B 43/00* (2013.01); *G06Q 10/00* (2013.01); *A63B 47/021* (2013.01); *A63B 43/004* (2013.01); *A63B 2024/0037* (2013.01); *A63B 2220/12* (2013.01); *A63B 2225/54* (2013.01)
USPC .......................................... 701/32.4; 473/131

(58) Field of Classification Search
USPC ............... 701/32.4, 32.3; 473/409, 407, 131; 414/440, 338; 700/90, 94
See application file for complete search history.

(56) References Cited

U.S. PATENT DOCUMENTS

| | | | |
|---|---|---|---|
| 5,114,155 A | 5/1992 | Tillery et al. | |
| 5,370,389 A | 12/1994 | Reising | |
| 5,439,224 A | 8/1995 | Bertoncino | |
| 5,445,374 A | 8/1995 | Clark, Jr. | |
| 5,505,452 A | 4/1996 | Meaden | |
| 5,533,646 A * | 7/1996 | Dildine | 221/185 |
| 5,626,531 A | 5/1997 | Little | |
| 5,632,687 A | 5/1997 | Bunyi | |
| 5,653,642 A | 8/1997 | Bonacorsi | |

(Continued)

FOREIGN PATENT DOCUMENTS

JP 2005-058325 A 3/2005
KR 10-0801636 B1 2/2008

(Continued)

OTHER PUBLICATIONS

International Search Report and Written Opinion of the International Searching Authority; PCT/US2012/039725; Feb. 1, 2013; 10 pp.

*Primary Examiner* — Muhammad Shafi
(74) *Attorney, Agent, or Firm* — Perkins Coie LLP

(57) ABSTRACT

A golf ball tracking system comprising at least one golf ball including an RFID device, wherein the RFID device contains golf ball information, such as a unique identifier. The system includes an RFID reader capable of reading the golf ball information from the RFID device. A positioning system, such as GPS, is associated with the reader and is capable of determining the location of the reader. A computer is interconnected with the RFID reader and the positioning system that is capable of receiving the golf ball information from the reader and location information from the positioning system. The computer is operative to record the golf ball information and associated location information. The system may further comprise a plurality of readers separated by at least one blocker that is made of metal screen.

15 Claims, 3 Drawing Sheets

(56) References Cited

U.S. PATENT DOCUMENTS

| | | |
|---|---|---|
| 5,743,804 A | 4/1998 | Bacon |
| 5,743,815 A | 4/1998 | Helderman |
| 6,322,455 B1 | 11/2001 | Howey |
| 6,607,123 B1 | 8/2003 | Jollifee et al. |
| 6,974,391 B2 | 12/2005 | Ainsworth et al. |
| 6,998,965 B1 | 2/2006 | Luciano, Jr. et al. |
| 7,462,010 B1 * | 12/2008 | Wittek et al. ............... 414/440 |
| 2002/0177490 A1 | 11/2002 | Yong et al. |
| 2003/0191547 A1 * | 10/2003 | Morse ........................ 700/91 |
| 2006/0170230 A1 | 8/2006 | Lee |
| 2008/0189004 A1 | 8/2008 | McMurtry et al. |
| 2008/0207357 A1 | 8/2008 | Savarese et al. |
| 2008/0220892 A1 | 9/2008 | Williamson et al. |
| 2009/0017944 A1 | 1/2009 | Savarese et al. |
| 2010/0250024 A1 | 9/2010 | Macedo Ribeiro et al. |

FOREIGN PATENT DOCUMENTS

| | | |
|---|---|---|
| KR | 10-2011-0027515 | 3/2011 |
| WO | 2006/119563 A1 | 11/2006 |
| WO | 2008/085068 A1 | 7/2008 |
| WO | 2009/009147 A1 | 1/2009 |

* cited by examiner

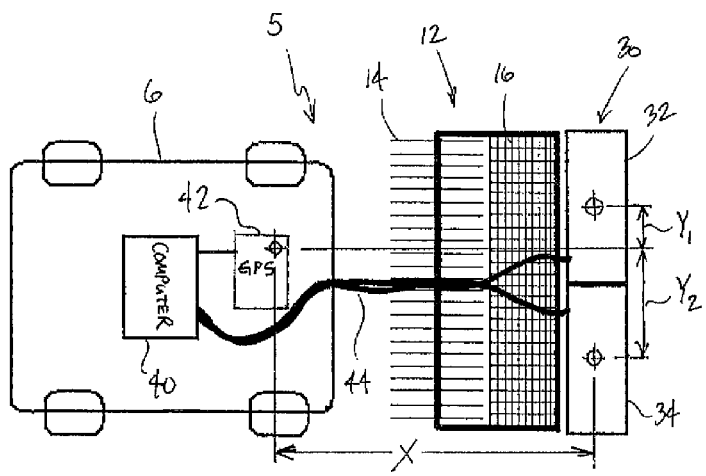
FIG. 3
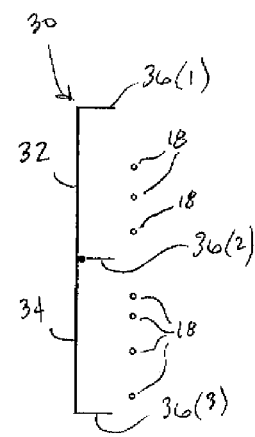
FIG. 4
| Customer ID | Ball ID | Optional | Reader ID | Offset | Cart Location | TimeStamp | Derived Location |
|---|---|---|---|---|---|---|---|
| 555 | 1232 | | 1 | 5,3 | 39.74351,-104.98778 | 12:32:52 | 39.74346,-104.98781 |
| 555 | 1233 | | 1 | 5,3 | 39.74351,-104.98779 | 12:33:01 | 39.74346,-104.98782 |
| 555 | 1234 | | 1 | 5,3 | 39.74351,-104.98780 | 12:33:10 | 39.74346,-104.98783 |
| 555 | 1235 | | 1 | 5,3 | 39.74351,-104.98781 | 12:33:19 | 39.74346,-104.98784 |
| 555 | 1236 | | 1 | 5,3 | 39.74351,-104.98782 | 12:33:28 | 39.74346,-104.98785 |
| 555 | 1237 | | 1 | 5,3 | 39.74351,-104.98783 | 12:33:37 | 39.74346,-104.98786 |
| 555 | 1238 | | 1 | 5,3 | 39.74351,-104.98784 | 12:33:46 | 39.74346,-104.98787 |
| 555 | 1239 | | 1 | 5,3 | 39.74351,-104.98785 | 12:33:55 | 39.74346,-104.98788 |
| 555 | 1240 | | 2 | 4,2 | 39.74351,-104.98786 | 12:34:04 | 39.74347,-104.98780 |
| 555 | 1241 | | 2 | 4,2 | 39.74351,-104.98787 | 12:34:13 | 39.74347,-104.98781 |
| 555 | 1242 | | 2 | 4,2 | 39.74351,-104.98788 | 12:34:22 | 39.74347,-104.98782 |
| 555 | 1243 | | 2 | 4,2 | 39.74351,-104.98789 | 12:34:31 | 39.74347,-104.98783 |
| 555 | 1244 | | 2 | 4,2 | 39.74351,-104.98790 | 12:34:40 | 39.74347,-104.98784 |
| 555 | 1245 | | 2 | 4,2 | 39.74351,-104.98791 | 12:34:49 | 39.74347,-104.98785 |
| 555 | 1246 | | 2 | 4,2 | 39.74351,-104.98792 | 12:34:58 | 39.74347,-104.98786 |
| 555 | 1247 | | 2 | 4,2 | 39.74351,-104.98793 | 12:35:07 | 39.74347,-104.98787 |
| 555 | 1248 | | 2 | 4,2 | 39.74351,-104.98794 | 12:35:16 | 39.74347,-104.98788 |
| 555 | 1249 | | 2 | 4,2 | 39.74351,-104.98795 | 12:35:25 | 39.74347,-104.98789 |
| 555 | 1250 | | 2 | 4,2 | 39.74351,-104.98796 | 12:35:34 | 39.74347,-104.98790 |
| 555 | 1251 | | 2 | 4,2 | 39.74351,-104.98797 | 12:35:43 | 39.74347,-104.98791 |
FIG. 6

GOLF BALL TRACKING SYSTEM AND METHODS THEREFOR

CROSS-REFERENCE TO RELATED APPLICATIONS

This application claims the benefit of U.S. Provisional Application No. 61/490,781, filed May 27, 2011, the disclosure of which is hereby incorporated by reference in its entirety.

FIELD OF THE DISCLOSURE

The present disclosure relates to the game of golf and golf ball driving ranges. More particularly it relates to a golf ball tracking and location derivation system.

BACKGROUND

Golf is a very popular game all over the world. Golf requires a great deal of skill in order to be competitive. Accordingly, golfers practice as much as possible to improve their distance and accuracy. Practice is particularly important with respect to fairway driving shots. Driving ranges have been established to allow golfers to concentrate on practicing long range shots without the time and expense of a full round of golf. The typical driving range includes a parcel of land with a series of driving stations, or stalls. A golfer usually rents a bucket of range balls and practices driving the balls down range from one of the driving stations. Once the golfer's practice session is complete the golfer leaves the range and does not have to be concerned with collecting the balls.

While a driving range provides golfers an opportunity to practice, the range can only provide limited feedback. Appropriate feedback is an important part of developing an improving skill and technique. A golfer may aim for a target placed on the range and gain some satisfaction if it appears that the ball landed near the target. However, such feedback is only qualitative and requires the golfer to remember each stroke and determine subjectively an overall performance for the practice session.

Accordingly, there is a need for a golf ball tracking system that allows golfers to track their performance at a driving range. There is a further need for a golf ball tracking system that is convenient and economical for the range operator.

SUMMARY

Disclosed herein is a system of networked mobile radio frequency identifier (RFID) readers which identify the physical location of passive RFID embedded golf balls where they lay on a driving range with the use of a global positioning system (GPS), local GPS, or any other positioning system. The physical location of each ball is determined by blocking the RFID readers to only identify RFID embedded golf balls in a small area. The mobile RFID readers are attached to a cart, known as a ball picker, or other device, which moves around the range and picks up the balls (or moves over or by the balls), reading their location before or while picking up the balls. It is contemplated that the disclosed golf ball tracking system can be incorporated into a ball picker as it is manufactured or may be retrofitted to existing ball picker equipment.

Multiple RFID antennas and/or readers may be used to more precisely identify the location of the golf ball where it lays when the readers move over the balls to read their respective locations. For example, three antennas or readers may be used to cover three linear feet with each reader covering one foot. As the balls are read, the system saves the ball ID along with the cart's GPS coordinates (i.e. location and elevation). In this way, the location of the ball can be resolved to within one foot of where each ball lays. More antennas and/or readers can be added covering a smaller area for more precision. Multiple antennas may be connected to a single reader via a multiplexer.

The ball picker cart includes a GPS unit with a known location offset from each RFID reader. A local GPS system may be used in order to enhance the precision of the ball locations. The range may also have embedded RFID tags which can be used to align the GPS reading with previous and future readings. Embedded tags buried in the range could also be used in place of GPS to determine the location of the readers. In an embodiment, the RFID readers are positioned on the ball picker (i.e. in front of the basket) to read the balls ID before the ball is moved to be picked up. Alternatively, the antenna could be on top of or underneath the basket. When placed on top the antenna could read the balls as they drop into the bucket.

Ball IDs may be associated with the customer as well as a golf club ID. The customer may input this data prior to hitting each ball. Some data may be programmed or input into the RFID as the balls are dispensed from a ball rental unit, such as the customer's ID and a driving range ID. This data may also be saved when the customer rents his bucket of balls. The ball ID, GPS location, cart ID, reader ID, time of day, and wind speed and direction are examples of data that may be saved when the ball is retrieved, or collected. A cell phone could be used to collect information such as GPS location, club that hits the ball etc. In an embodiment, an application is provided that runs on the cell phone and collect the information which may be uploaded to a website. Example Data collected GPS location, elevation, Club ID, Ball ID. An RFID reader may be connected to the cell phone or may be built into the phone. Furthermore, a custom made device could be made to record and save the data. The GPS location offset(s) may be applied at the time of saving or as a post processing step. Furthermore, each ball's location may be used to derive, for example and without limitation, distance, precision, and accuracy metrics for each customer.

The above described data can be downloaded to a server periodically via Bluetooth, direction network, wifi, direct LAN, WAN, or physical drive to name a few. The data and derived metrics may also be displayed to a customer by, for example, a print out, display device, web interface, mobile device, and combinations thereof. Ball location data may be plotted on a rendering of the range to provide a graphical representation of the customer's performance.

Balls hit out of bounds or taken from the range can be identified since each ball ID is saved with a customer ID when rented to a customer. This can be used for theft tracking, liability tracking if, for example, a ball breaks something or consistently lands out of bounds. The RFID tags also allow buried balls or balls in deep grass to be located.

In an exemplary embodiment, the golf ball tracking system comprises at least one golf ball including an RFID device, wherein the RFID device contains golf ball information, such as a unique identifier. The system also includes an RFID reader capable of reading the golf ball information from the RFID device. A positioning system, such as GPS, is associated with the reader and is capable of determining the location of the reader. A computer is interconnected with the RFID reader and the positioning system and capable of receiving the golf ball information from the reader and location information from the positioning system and operative to record the golf ball information and associated location information. The system may further comprise a plurality of readers separated by at least one blocker that is made of metal screen. The golf ball tracking system may further comprise a golf ball picker and a golf ball dispenser rental unit.

Also contemplated herein, is a golf ball picker. In an exemplary embodiment, the golf ball picker includes a vehicle, such as a golf cart, with at least one picker assembly attached thereto. An RFID reader is disposed on the picker assembly and is capable of reading golf ball information from an RFID device. For example, an RFID device disposed in a golf ball. A positioning system is disposed on the vehicle and is capable of determining the location of the vehicle. A computer is interconnected with the RFID reader and the positioning system and is capable of receiving the golf ball information from the reader and location information from the positioning system. The computer is operative to record the golf ball information and location information.

A method of tracking the location of a golf ball is also disclosed. In an exemplary embodiment, the method comprises providing, at a first location, a golf ball including an RFID device, wherein the RFID device contains golf ball information. The golf ball is moved from the first location to a second location by striking the golf ball with a golf club, for example. The second location of the golf ball is recorded and the golf ball is collected. The golf ball information is read from the RFID device of the golf ball and the golf ball information is associated with the second location. The golf ball information, second location, and customer information are associated in a database. The golf ball may be collected with a ball picker.

In one aspect of the technology described herein, recording the second location of the golf ball includes recording a location of the ball picker at approximately the same time the golf ball information is read from the RFID device. The location of the ball picker is determined with a GPS mounted on the ball picker. The second location is derived from the location of the ball picker by applying an X offset and a Y offset corresponding to the location of the RFID reader relative to the ball picker GPS.

These and other aspects of the technology and its various embodiments will be apparent after consideration of the Detailed Description and Figures herein. It is to be understood, however, that the scope of the invention shall be determined by the claims as issued and not by whether given subject matter addresses any or all issues noted in the background or includes any features or aspects recited in this summary.

BRIEF DESCRIPTION OF THE DRAWINGS

The accompanying drawings, which are incorporated in and constitute a part of this specification, illustrate embodiments of a golf ball tracking system and together with the description, serve to explain the principles and operation thereof. Like items in the drawings are generally referred to using the same numerical reference.

FIG. 3 is a schematic representation of a golf ball picker including a golf ball tracking system according to an exemplary embodiment;

FIG. 4 is a schematic representation of the golf ball tracking system's antenna as viewed from the front;

FIG. 6 is an exemplary data structure for the golf ball tracking system according to an exemplary embodiment.

DETAILED DESCRIPTION

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense.

Figure 1:
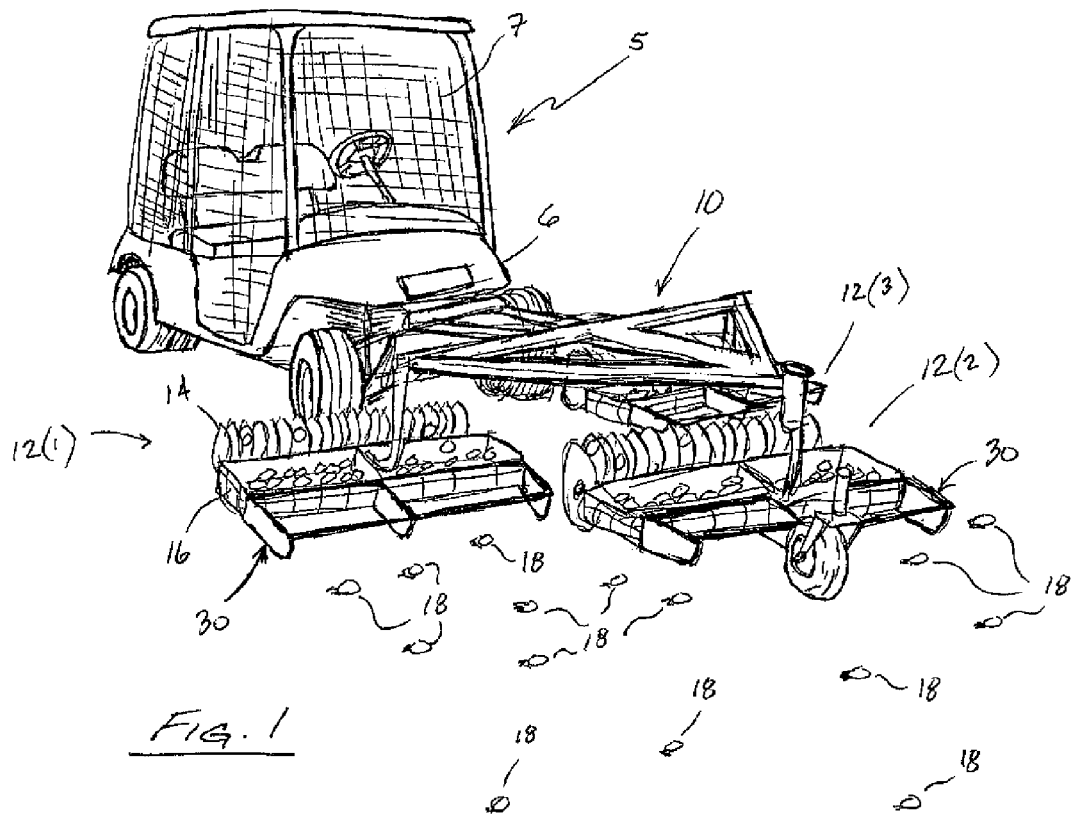
FIG. 1 is a perspective view of a golf ball picker including a golf ball tracking system according to an exemplary embodiment.

Described herein is a golf ball tracking system that allows golfers to track their performance at a driving range. FIG. 1 illustrates a golf ball picker 5 fitted with a golf ball tracking system according to an exemplary embodiment. The golf ball picker 5 includes a vehicle, such as golf cart 6 that has a passenger compartment with screens 7 to protect the driver from golf balls. Golf ball picker 5 includes a frame 10 that connects cart 6 to a plurality of picker assemblies 12(1)-12(3). Each picker assembly 12 includes a basket portion 16 along with a picker wheel assembly 14, which includes a plurality of discs or wheels between which golf balls are captured and rotated from the ground into basket 16. In this embodiment, each picker assembly 12 is fitted with an RFID reader assembly 30. Reader assembly 30 reads the golf ball information including a unique golf ball identifier for each golf ball 18 before it is picked up by wheel assembly 14 and deposited in basket 16.

Figure 2:
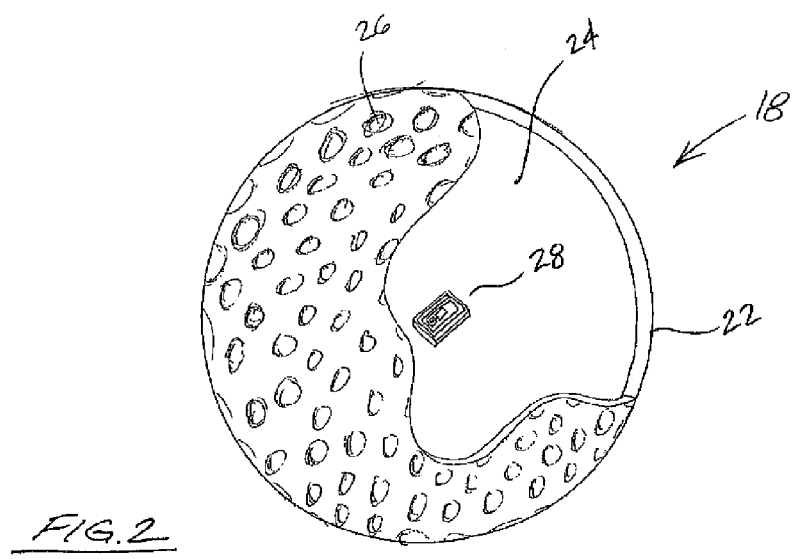
FIG. 2 is a partial cut-away view of a radio frequency identification golf ball according to an exemplary embodiment.

FIG. 2 illustrates a golf ball 18 which includes an RFID chip 28, also referred to as RFID devices and RFID tags. RFID chip 28 may be manufactured into the core 24 of golf ball 18 or, alternatively, may be inserted post-production by drilling a hole through cover 22 and into core portion 24. It is contemplated herein that RFID chip 28 is a passive RFID. However, the system could comprise active RFIDs. Chip 28 may be inserted into the drilled hole and sealed therein with glue or potting material. Alternatively, the chip may be disposed between the core and the cover. In another embodiment, the RFID device may be disposed in the core or between the core and cover and connected to an antenna that is disposed between the core and cover. The antenna between the cover and the core may comprise a paint like liquid. RFID chips are known in the art and various RFIDs may be used in the present system. For example, passive RFID model no. RI-I17-114A-01-Tag-It™ HF-I Standard Transponder Inlays CD available from Texas Instruments™ is a suitable RFID. An ultra high frequency or 13.56 GHz RFID chip may be used. Also, each ball may include a plurality of RFID chips.

FIG. 3 is a schematic representation of the golf ball tracking system installed on a golf cart 6. The golf ball tracking system is comprised of reader assembly 30 which is connected to a computer 40 via cables 44. The system also includes a positioning system, such as GPS device 42 that is operatively connected to computer 40. A local GPS system may be used in order to enhance the precision of the ball locations. The range may also have embedded RFID tags which can be used to align the GPS reading with previous and future readings. Embedded tags buried in the range could also be used in place of GPS to determine the location of the readers.

FIG. 3 also shows the offset distances between the GPS 42 and each reader 32, 34. For example, reader 32 is offset from GPS 42 by distance X and $Y_1$. Similarly, reader 34 is offset from GPS 42 by distance X and $Y_2$. These known offsets are pre-programmed into Computer 40 to be used in calculating the actual position of each golf ball. Computer 40 may be in the form of a laptop or a mobile device. The computer may be ruggedized to handle the terrain of a typical driving range.

The golf ball tracking system may be integrated with golf ball picker 5 or, alternatively, the system may be retrofit to an existing golf ball picker. With further reference to FIG. 4, it can be appreciated that RFID reader assembly 30 is comprised of a pair of RFID readers 32 and 34 which are separated by a plurality of blockers 36(1)-36(3). Blockers 36 extend between the readers 32 and 34 to prevent cross-reading of golf balls 18 by both receivers. However, if a ball is read by two readers, the average of the two reader locations can be applied to that ball. Blockers 36 are comprised of wire mesh material that blocks the RFID signals. For example, the blockers may be comprised of an aluminum wire mesh material with a mesh spacing of approximately 0.0625 inches. The blockers may be made of other suitable metals such as copper or steel. The wire mesh spacing of the blockers may vary as well. In another embodiment, blockers 36 may be comprised of plate or sheet material, such as aluminum sheet material. Furthermore, the blockers may be formed from sheet material with a plurality of openings formed therethrough. Preferably, the blockers are grounded.

Suitable RFID readers are available from FEIG Electronics, Inc. Each reader 32, 34 is connected to computer system 40 by cables 44. Readers 32 and 34 may be networked to computer 40. Computer 40 is configured with the appropriate hardware interface and software to operate readers 32 and 34 as is known in the art. The tracking system could also include other antennas or readers located on other devices, such as maintenance equipment. Also, readers could be positioned at each driving station to automatically record from which station a ball was hit. Multiple antennas could be connected to a multiplexer which is connected to a single reader which connects to a computer.

Figure 5:
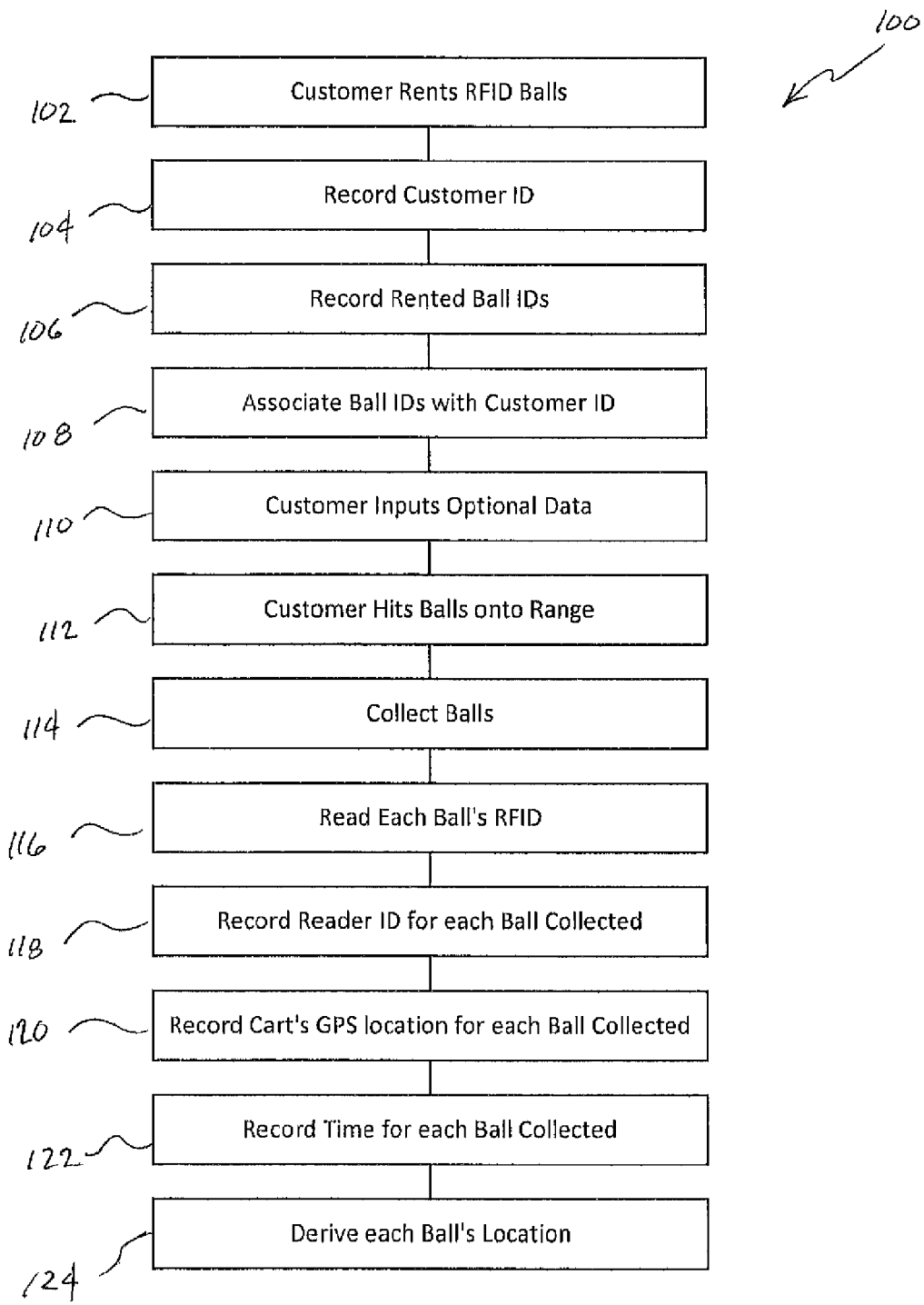
FIG. 5 is a flow diagram illustrating steps in the golf ball tracking system according to an exemplary embodiment.

FIG. 5 is a flow diagram that represents the steps that may be taken in the process of recording the location of golf balls at a driving range according to an exemplary embodiment. Process 100 includes step 102 where the customer rents golf balls that are fitted with RFID devices as explained above. In step 104, the customer ID is recorded, and the golf balls rented by the customer are also recorded at step 106. The rented golf balls are associated with the customer's ID at step 108. Some information may be programmed or input into the RFID as the balls are dispensed from a ball rental dispenser unit, such as the customer's ID and a driving range ID. At step 110, the customer may input optional data, such as for example, the golf club with which the customer intends to hit the ball. At step 112, the customer proceeds to hit the balls downrange from a driving station. Once the balls are hit downrange, the balls are collected at step 114 with a ball picker, such as a ball picker 5 fitted with the golf ball tracking system disclosed and shown in FIGS. 1 and 3. As each ball is collected, each ball's RFID device is read at step 116. At step 118, the reader ID is recorded for each ball collected so that the appropriate offset may be applied to the ball's position. The GPS location offset(s) may be applied at the time of saving or as a post processing step. At step 120, the cart's GPS location is recorded for each ball collected, and at step 122, the collection time stamp is recorded for each ball collected. Finally, at step 124, the ball's location as well as other metrics may be derived from the recorded information above as well as pre-programmed information, such as the reader offsets.

FIG. 6 represents an exemplary data set 60 associated with the variables recorded during collection. A data set, such as data set 60, may be stored in a database as is known in the art. Data set 60 includes the customer ID in column 62, ball ID 64, optional data 66, reader ID 68, reader ID offset information 70, cart GPS location 72, time stamp 74, and the derived location 76. Cart location 72, as shown here, is in GPS coordinate format of latitude and longitude. Other positioning formats may be used as desired. Column 76 represents the derived location which includes an addition or subtraction of the offset variables 70 to the cart's location 72, thereby resulting in a more accurate golf ball location. If two readers read the same ball ID, the average of the offset corrected GPS locations may be used as the ball's position.

Column 76 is merely an example of some of the metrics that may be derived from the location data for each golf ball. An additional example is the distance that the ball was hit, which may be derived by comparing the location of the ball and the location of the driving station from which it was hit. Driving station location GPS Coordinates and elevation could be predetermined and loaded into the system. Furthermore, each ball's location may be used to derive, for example and without limitation, distance, precision, and accuracy metrics for each customer.

The above described data can be downloaded to a server periodically via Bluetooth, direction network, wifi, direct LAN, WAN, or physical drive to name a few. The data and derived metrics may also be displayed to a customer by, for example, a print out, display device, web interface, mobile device, and combinations thereof. Ball location data may be plotted on a rendering of the range to provide a graphical representation of the customer's performance.

Accordingly, the golf ball tracking system has been described with some degree of particularity directed to the exemplary embodiments. It should be appreciated; however, that the present invention is defined by the following claims construed in light of the prior art so that modifications or changes may be made to the exemplary embodiments without departing from the inventive concepts contained herein.

What is claimed is:

1. A golf ball tracking system, comprising:
   at least one golf ball including a radio frequency identifier (RFID) device, wherein the RFID device contains golf ball information;
   a plurality of RFID readers capable of reading the golf ball information from the RFID device;
   at least one RFID signal blocker extending between the RFID readers;
   a positioning system associated with the readers and capable of determining the location of the readers; and
   a computer interconnected with the RFID readers and the positioning system and capable of receiving the golf ball information from the readers and location information from the positioning system and operative to record the golf ball information and associated location information.

2. The golf ball tracking system according to claim 1, wherein the positioning system comprises a global positioning system (GPS).

3. The golf ball tracking system according to claim 1, wherein the at least one blocker comprises metal screen.

4. The golf ball tracking system according to claim 1, wherein the golf ball information includes a unique golf ball identifier.

5. The golf ball tracking system according to claim 1, further comprising a golf ball picker.

6. A golf ball picker, comprising:
   a vehicle with at least one picker assembly attached thereto;
   a plurality of RFID readers disposed on the picker assembly and capable of reading golf ball information from an RFID device;
   at least one RFID signal blocker extending between the RFID readers;
   a positioning system disposed on the vehicle and capable of determining the location of the vehicle; and
   a computer interconnected with the RFID readers and the positioning system and capable of receiving the golf ball information from the readers and location information from the positioning system and operative to record the golf ball information and location information.

7. The golf ball picker according to claim 6, wherein the positioning system comprises a global positioning system (GPS).

8. The golf ball picker according to claim 6, wherein the at least one blocker comprises metal screen.

9. The golf ball picker according to claim 6, wherein the vehicle is a golf cart.

10. A method of tracking the location of a golf ball, the method comprising:
    providing, at a first location, a golf ball including an RFID device, wherein the RFID device contains golf ball information;
    moving the golf ball from the first location to a second location;
    recording the second location of the golf ball;
    collecting the golf ball with a ball picker having a GPS and an RFID reader mounted thereon;
    reading the golf ball information from the RFID device; and
    associating the golf ball information with the second location,
    wherein the second location is derived by applying an X offset and a Y offset corresponding to a location of the RFID reader relative to the ball picker GPS.

11. The method according to claim 10, wherein moving the golf ball from the first location to a second location comprises striking the golf ball with a golf club.

12. The method according to claim 10, wherein the step of recording the second location of the golf ball includes recording a location of the ball picker at approximately the same time the golf ball information is read from the RFID device.

13. The method according to claim 12, including determining the location of the ball picker with the GPS mounted on the ball picker.

14. The method according to claim 10, further comprising associating customer information with the golf ball information.

15. The method according to claim 14, wherein the golf ball information, second location, and customer information are associated in a database.

\* \* \* \* \*